(12) United States Patent
Durell

(10) Patent No.: US 7,903,352 B2
(45) Date of Patent: Mar. 8, 2011

(54) LENS MOUNTING SYSTEM FOR USE IN LENS RELAY SYSTEMS

(75) Inventor: William E. Durell, Las Vegas, NV (US)

(73) Assignee: Durell & Gitelis, Inc., Las Vegas, NV (US)

( * ) Notice: Subject to any disclaimer, the term of this patent is extended or adjusted under 35 U.S.C. 154(b) by 21 days.

(21) Appl. No.: 12/433,210

(22) Filed: Apr. 30, 2009

(65) Prior Publication Data

US 2010/0277817 A1    Nov. 4, 2010

(51) Int. Cl.
*G02B 7/02* (2006.01)
(52) U.S. Cl. .......................... 359/811; 359/819
(58) Field of Classification Search ................... 359/811, 359/815–819, 827, 830
See application file for complete search history.

(56) References Cited

U.S. PATENT DOCUMENTS

| 3,257,902 A | 6/1966 | Hopkins |
| 3,609,012 A * | 9/1971 | Street ............................ 359/715 |
| 5,936,239 A | 8/1999 | Tsai et al. |
| 6,172,822 B1 | 1/2001 | Belliveau et al. |
| 7,111,999 B2 | 9/2006 | Tsai |
| 7,538,959 B1 * | 5/2009 | Wheeler ....................... 359/819 |
| 2005/0249464 A1 | 11/2005 | Case et al. |

OTHER PUBLICATIONS

PCT/US2010/032654 International Search Report mailed Jun. 28, 2010 (2 pages).

* cited by examiner

*Primary Examiner* — Timothy J Thompson
(74) *Attorney, Agent, or Firm* — Wilmer Cutler Pickering Hale and Dorr LLP

(57) ABSTRACT

An improved lens mounting systems for use in lens relay systems in disclosed. The lens mounting system includes at least one lens and a tubular lens mount. The tubular lens mount is portion of a cylinder with a cross section slightly larger than a semicircle. The edges of the tubular lens mount may be beveled. The inner diameter of the tubular lens mount may be equal to, or slightly smaller than, the outer diameter of the lens. In addition, the tubular lens mount may be in three point contact with the mounted lens.

8 Claims, 3 Drawing Sheets

# LENS MOUNTING SYSTEM FOR USE IN LENS RELAY SYSTEMS

BACKGROUND OF THE INVENTION

The invention relates generally to an improved lens mounting system for use in field and lens relay systems. Such systems are used in endoscopes and similar optical instruments.

A lens relay system is an optical system consisting of a sequence of lenses that relays the viewed image from lens to lens. Typically each lens relay set in the sequence takes the image from the preceding lens relay set and forms a new image, used as the input to the next lens relay set. The use of a field and lens relay system in an endoscope or other medical device is well known. One well known lens relay system is described in U.S. Pat. No. 3,257,902 and is referred to as the "Hopkins" relay lens system. This system transfers an optical image developed by an objective lens to an adjacent relay lens system or an eyepiece lens and achieves an acceptable level of transfer of a high brightness image with correction of optical aberrations.

One particular challenge in manufacturing such a lens relay system is the mounting of the series of lens such that the lenses are held in the correct position relative to one another and that the lens centerlines remain collinear. One method of mounting a series of lenses is to use a cylindrical mounting tube. Each lens is placed, in order and with spacers, in the mounting tube and slid down to the lens or spacer below it prior to being secured in place. However, this process requires that the outer diameter of each lens to be slightly smaller that the inner diameter of the mounting tube to allow for the lens to be slid down the mounting tube into position. This, in turn, means that the level of precision in mounting each lens is less than ideal as the lens centerlines may not be exactly collinear due to the required space between the lens outer diameter and the mounting tube inner diameter.

There is a need for an improved lens mounting system for use in devices that require a field and lens relay system. In particular, there is a need for a lens mounting system in which lenses can be held in position relative to each other with a high degree of precision such that the lens centerlines remain collinear. In this specification and in the appended claims the term "endoscope" means and should be interpreted to include an endoscope or any other similar optical instrument, whether used for surgery or other applications. In addition the improved lens mounting system is not limited to endoscopes and may be used in any optical application requiring a series of mounted lenses.

BRIEF SUMMARY OF THE INVENTION

An improved lens mounting system in accordance with the present invention includes a tubular lens mount. The tubular lens mount is a hollow approximately half-cylindrical structure with an inner diameter equal to or smaller than the outer diameter of the lenses. In certain embodiments the edges of tubular lens mount are beveled to prevent damage to the lenses where the tubular lens mount and lenses are in contact. The improved lens mounting system may itself be sheathed in an outer cylinder for protection of the lenses.

Other features and advantages of the present disclosure will become apparent from the following description of the disclosure that refers to the accompanying drawings.

BRIEF DESCRIPTION OF THE DRAWINGS

For a fuller understanding of the present invention, reference should be made to the following detailed description taken in connection with the accompanying drawings, not drawn to scale, in which the same reference numerals indicate the same or similar parts, wherein.

With reference to the drawings, the features thereof are described below.

DETAILED DESCRIPTION OF THE INVENTION

Figure 1:
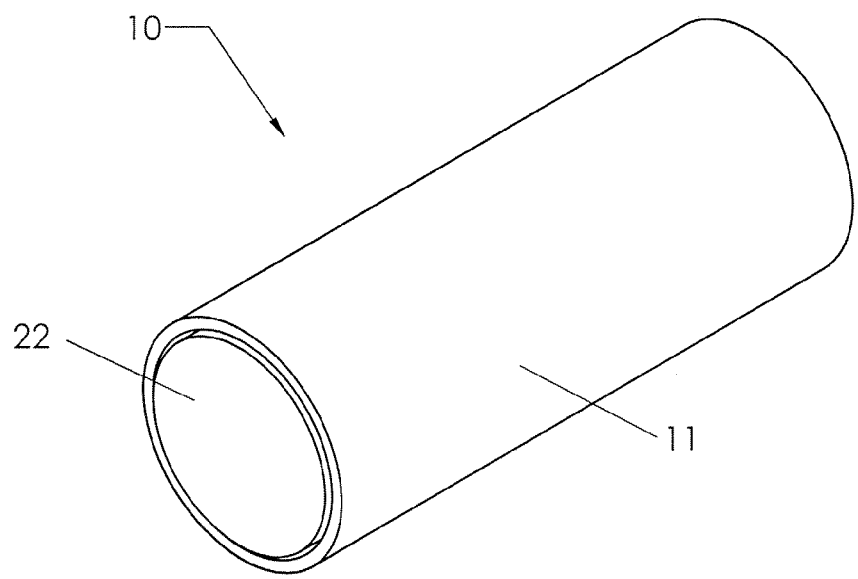
FIG. 1 is a perspective view of a conventional lens relay system.

FIG. 1 shows a conventional lens mounting system 10 for use in a field and relay lens system. As discussed above, one method of mounting a series of lenses is to use a cylindrical mounting tube 11. Each lens 22 is placed, in order, in the mounting tube and slid down to the lens or spacer below it prior to being secured in place. However, this process requires that the outer diameter of each lens is slightly smaller that the inner diameter of the mounting tube 11 to allow for the lens 22 to be slid down the mounting tube 11 into position. This, in turn, means that the level of precision in mounting each lens is less than ideal as the lens centerlines by not be exactly collinear due to the space between the outer diameter of the lens and the inner diameter the mounting tube.

Figure 2:
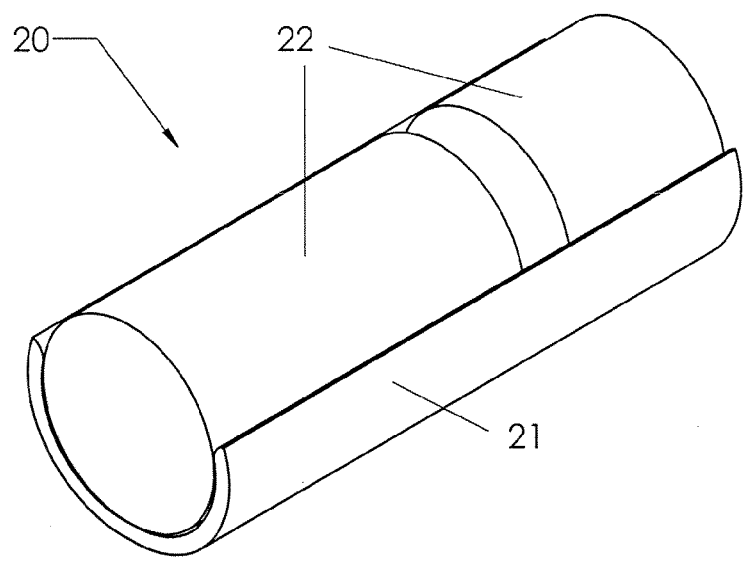
FIG. 2 is a perspective view of an improved lens mounting system according to an embodiment of the present invention.

FIG. 2 shows an improved lens mounting system 20 for use in a field and relay lens system. Unlike a conventional designs, the improved tubular lens mount 21 is constructed in the shape of a hollow cylinder that has been cut parallel to the longitudinal axis of the cylinder. This results in a shape approximating a hollow half cylinder and, unlike conventional designs, allows full access to what was previously the interior of the cylinder. The full access to the interior of the cylindrical shell allows for the precise placement and alignment of individual lenses 22 in the tubular lens mount 21. In addition, unlike conventional designs, the inner diameter of the hollow cylinder is equal to or slightly smaller that the diameter of the lenses to be mounted.

Figure 3:
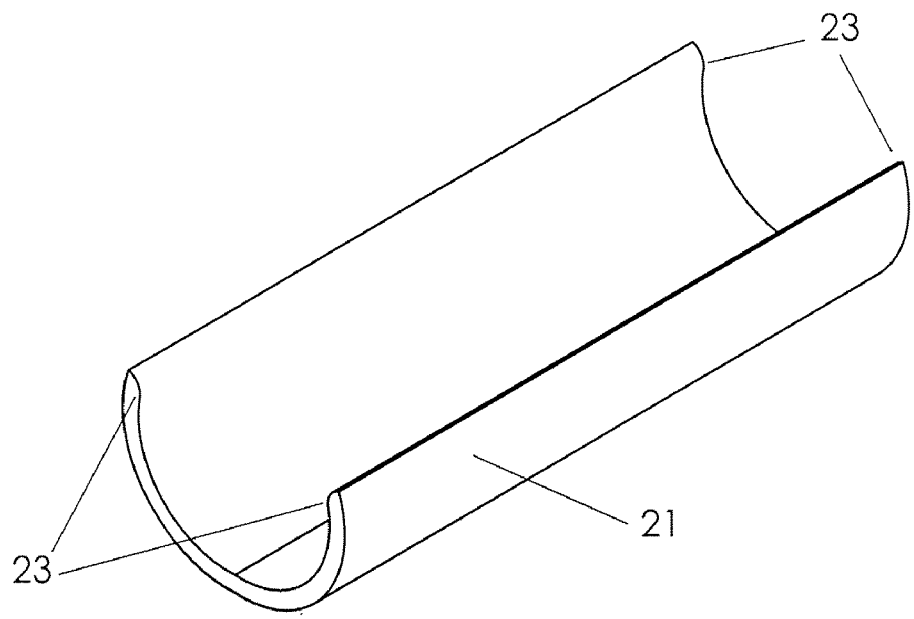
FIG. 3 is a perspective view of a tubular lens mount used in an embodiment of the present invention.

FIG. 3 shows an perspective view of the improved tubular lens mount 21. The tubular lens mount 21 is in the shape of a hollow cylinder that that been cut parallel to the longitudinal axis. The tubular lens mount 21 may be constructed of any suitable material including metals, such as stainless steel or aluminum, plastics, or various composite material. The material should have sufficient flexibility to allow for the expansion of edges 23 during the insertion of the lenses 22. The material should also have sufficient rigidity such that after the lenses 22 have been inserted the edges 23 return close to their original location and the tubular lens mount 21 returns close to its original diameter to hold the lenses 22 in place. The thickness of the tubular lens mount 21 will depend on the material selected for construction and must allow for the required flexibility (during insertion) and rigidity (while holding) the lens. In addition, the edges 23 of the tubular lens mount 21 are preferably beveled so as to not scratch or chip the lenses 23.

As will be shown in more detail below, the diameter of the tubular lens mount 21 is preferably equal to or slight less than the diameter of the lenses 22 to allow for a solid three point suspension of the lenses 22. However, additional mounting means are contemplated. For example, the lenses could be installed using a bonding agent (e.g. glue), screws and/or pins inserted tangentially through the tubular lens mount 21, soldering, or other conventional mounting means. Using any of these mounting methods, the ability to have access to the interior of the original cylindrical shell allows for more precise placement of the individual lenses 22. In addition, the completed assembly, including the tubular lens mount 21 and lenses 22, may itself be mounted in a outer cylinder or sheath to protect the lenses from dirt, dust, and other foreign objects.

Figure 4:
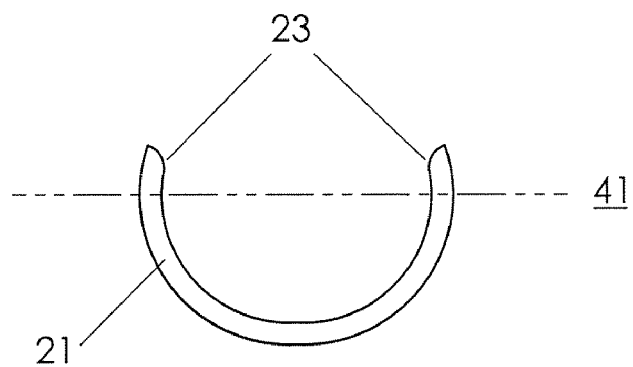
FIG. 4 is a front view of a tubular lens mount used in an embodiment of the present invention

FIG. 4 is a front view of the tubular lens mount 21 as seen looking down the longitudinal axis. This more clearly shows the preferred beveling of the edges 23 of the tubular lens mount 21. In addition it can be seen that the cut along the longitudinal axis of the full hollow cylinder is not at the equator 41 of the cylinder. The cut is made above the equator 41, and the resulting shape has the beveled edges 23 separated by a distance smaller than the inner diameter of the tubular lens mount 21. In an exemplary embodiment the inner diameter of the tubular lens mount 21 is 2.2 mm and the beveled edges 23 extend 0.4 mm above the longitudinal equator 41 of the tubular lens mount 21. While described as a hollow cylinder that has been cut, any method of manufacturing (e.g. extruding) the resulting hollow half cylinder shape of the tubular lens mount 21 is acceptable.

Figure 5:
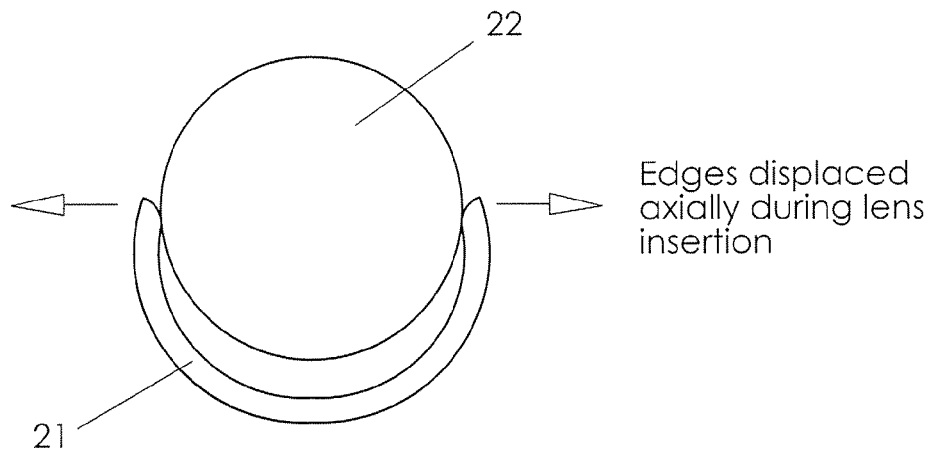
FIG. 5 shows the insertion of a lens into an improved lens mounting system according to an embodiment of the present invention.

FIG. 5 is a front view of the tubular lens mount 21 with a lens 22 partially inserted. Prior to the insertion of a lens 22, the distance between the two edges 23 of the tubular lens mount 21 is less than the outer diameter of the lens 22. The lens 22 is mounted in the tubular lens mount 21 by first forcing the edges 23 of the tubular lens mount 21 apart. This momentarily increases the effective diameter of the tubular lens mount 21, and increases the distance between edges 23 to allow for the insertion of lens 22. The lens 22 is inserted parallel to the longitudinal axis of the tubular lens mount 21.

The distance between the edges 23 must allow for the insertion of the lenses 22, and this provides an upper limit on how far the edges 23 of the tubular lens mount 21 may extend above the equator 41. In addition, the selection of the material used and the thickness of the tubular lens mount 21 will impact how far the edges 23 of the tubular lens mount 21 may extend above the equator 41. As noted above, the tubular lens mount 21 needs to have sufficient flexibility to allow for the expansion of edges 23 during the insertion of the lenses 22 and sufficient rigidity to hold the lenses 22 in place. The distance between the edges 23 is reduced the farther the edges 23 extend above the equator 41, requiring a more flexible material. The distance between the edges 23 is increased the closer the edges 23 are to the equator 41, allowing for the use of a less flexible material. If the edges 23 extend too far above the equator the tubular lens mount 21 will either be too rigid or too flexible. If the lens mount 21 is too rigid, the edges 23 will not flex apart far enough to allow the insertion of the lenses 22. If the lens mount 21 is too flexible, the edges 23 will not have sufficient rigidity to hold the lenses 22 in place after insertion.

Figure 6:
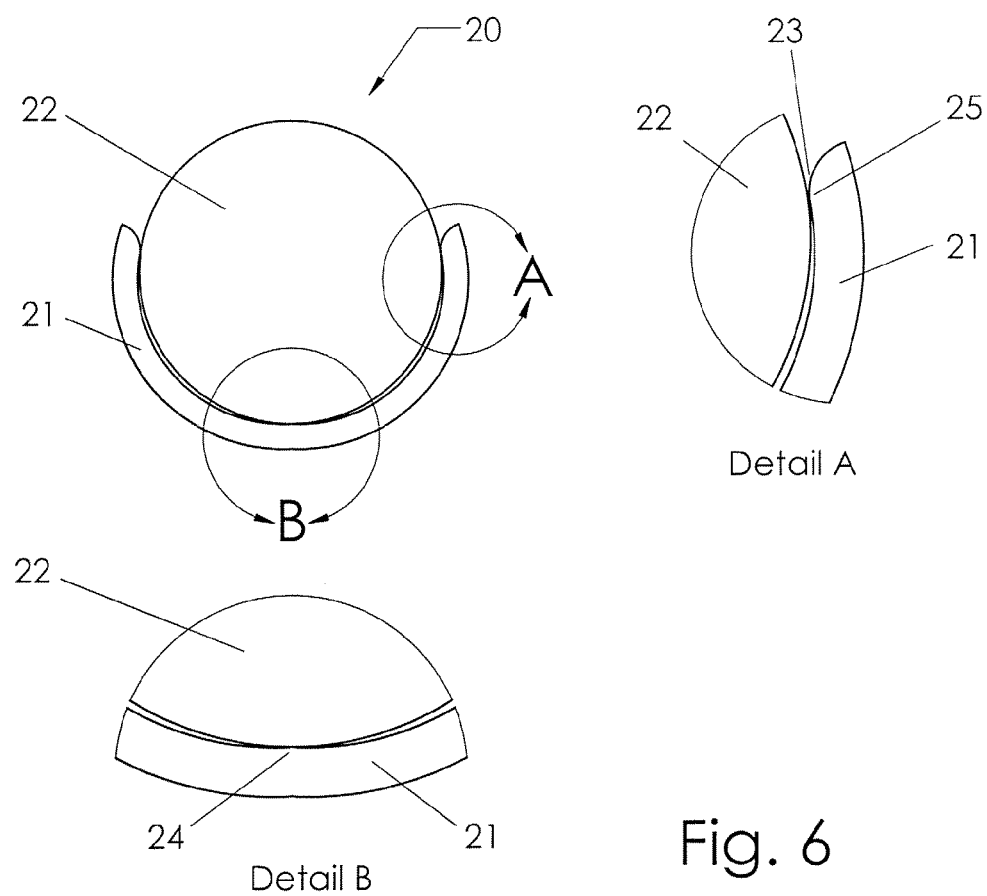
FIG. 6 is a front view of the tubular lens mount with a lens fully inserted with detailed views of the points of contact between the fully mounted lens and the tubular lens mount.

FIG. 6 is a front view of the tubular lens mount 21 with a lens 22 fully inserted. As noted in the discussion of FIG. 5, a lens 22 is mounted in the tubular lens mount 21 by first forcing the edges 23 of the tubular lens mount 21 apart. This results in an increased effective diameter of the tubular lens mount 21. Once in place, as shown in Detail B of FIG. 6, the lens 22 will now be in contact with the tubular lens mount 21 at a single point of contact 24 between the base of lens 22 and the center of the tubular lens mount 21. The force holding the edges 23 of the tubular lens mount 21 apart is then removed. This results in two additional points of contact 25 as shown in Detail A of FIG. 6. Specifically the lens 22 will now be in contact with the tubular lens mount 21 at each edge 23. This results in the lens 22 being held in suspension with three contacts points.

FIG. 6 shows that the outer circumference of lens 22 is not in complete contact with the inner surface of the tubular lens mount 21. As mentioned above, unlike conventional designs, the inner diameter of the tubular lens mount 21 is equal to or slightly smaller that the diameter of the lenses to be mounted. This prevents full circumferential contact between the lens 22 and the tubular lens mount 21. Instead, as the force holding the edges 23 apart is removed, the edges 23 will come in contact with the lens 22. This results in a slight bowing of the tubular lens mount 21 as shown in FIG. 6.

The tubular lens mount 21 may be used with any number or type of lenses that have a circular or cylindrical shape that is parallel to the direction of the light. These could include rod lenses, concave lenses, convex lenses, or doublets. In addition spacers may be used in the tubular lens mount 21 to separate individual lenses 22 by desired distances.

There are numerous advantages to this approach of constructing a field and relay lens system. First, lenses 22 may be installed and/or reinstalled in any order. With conventional designs, each lens 22 would have to be installed in sequence as there is no access to the interior of the full cylinder. This means that with conventional designs any repairs potentially require removing a large number of lenses 22 to obtain access to the correct lens 22. Second, because the outer diameter of the lenses 22 is not required to be smaller than the inner diameter of the mounting tube, precise placement of the lenses 22 is now possible. This allows for improved optical quality of the image, as the lens centerlines can be collinear. In addition the distance between each lens 22 in the field and relay lens system can be guaranteed. The combination of precise mounting of lenses 22 with the ability to mount lenses 22 in any order allows for great control over the optical quality of the images produced with a field and relay lens system of this type. In addition, if the lenses 22 in a field and relay lens system of this type become unaligned, easier access for realignment is possible.

Although the present disclosure has been described in relation to particular embodiments thereof, many other variations, modifications, combination of features, and other uses will become apparent to those skilled in the art. It is preferred, therefore, that the present disclosure be limited not by the specific disclosure herein, but only by the appended claims.

What is claimed is:

1. A lens mount system comprising:
    at least one lens;
    a tubular lens mount, wherein the tubular lens mount is a portion of a cylinder that has a cross section slightly larger than a semicircle cylinder and the at least one lens is mounted parallel to the longitudinal axis of the tubular lens mount, wherein the edges of the tubular lens mount are beveled.

2. A lens mount system comprising:
    at least one lens;
    a tubular lens mount, wherein the tubular lens mount is a portion of a cylinder that has a cross section slightly larger than a semicircle cylinder and the at least one lens is mounted parallel to the longitudinal axis of the tubular lens mount, wherein the inner diameter of the tubular lens mount is smaller than the outer diameter of the at least one lens.

3. A lens mount system comprising:

at least one lens;

a tubular lens mount, wherein the tubular lens mount is a portion of a cylinder that has a cross section slightly larger than a semicircle cylinder and the at least one lens is mounted parallel to the longitudinal axis of the tubular lens mount, wherein the lens is in three point contact with the tubular lens mount.

4. A lens mount system comprising:

at least one lens;

a tubular lens mount, wherein a) the tubular lens mount is approximately a hollow half-cylinder;

b) the arc of the base of the approximately hollow half-cylinder is greater that 180 degrees; and c) the at least one lens is mounted parallel to the longitudinal axis of the hollow half cylinder.

5. The lens mount system of claim 4, wherein the edges of the hollow half cylinder are beveled.

6. The lens mount system of claim 4, wherein the inner diameter of the tubular lens mount is equal to the outer diameter of the at least one lens.

7. The lens mount system of claim 4, wherein the inner diameter of the tubular lens mount is smaller than the outer diameter of the at least one lens.

8. The lens mount system of claim 4, wherein the lens is in three point contact with the tubular lens mount.

* * * * *